United States Patent
Hoffjann et al.

(10) Patent No.: US 7,118,677 B2
(45) Date of Patent: Oct. 10, 2006

(54) METHOD AND APPARATUS FOR PROCESSING AND RE-USING OF GRAY WATER FOR FLUSHING TOILETS

(75) Inventors: Claus Hoffjann, Hamburg (DE); Hans-Juergen Heinrich, Hamburg (DE)

(73) Assignee: Airbus Deutschland GmbH, Hamburg (DE)

( * ) Notice: Subject to any disclaimer, the term of this patent is extended or adjusted under 35 U.S.C. 154(b) by 0 days.

(21) Appl. No.: 10/613,530

(22) Filed: Jul. 3, 2003

(65) Prior Publication Data

US 2004/0045910 A1   Mar. 11, 2004

(30) Foreign Application Priority Data

Jul. 3, 2002 (DE) ................. 102 99 799

(51) Int. Cl.
C02F 1/467 (2006.01)
B01D 35/027 (2006.01)
B01D 36/02 (2006.01)

(52) U.S. Cl. ............ 210/744; 210/758; 210/806; 210/143; 210/153; 210/203; 210/275.1; 210/258

(58) Field of Classification Search ............ 210/748, 210/758, 806, 203, 205, 257.1, 7.258, 259, 210/262, 143, 149, 153, 170, 172, 181, 182, 210/192, 742, 744; 4/222, 222.1, 227.1, 4/665; 205/751; 742/744; 143/149, 153, 143/170, 172, 181, 182, 192
See application file for complete search history.

(56) References Cited

U.S. PATENT DOCUMENTS

| | | | |
|---|---|---|---|
| 3,318,449 A * | 5/1967 | Jennings et al. ............ 210/104 |
| 3,774,246 A * | 11/1973 | Beer ........................... 4/227.1 |
| 3,939,499 A | 2/1976 | Roberts |
| 4,713,525 A * | 12/1987 | Eastep ......................... 392/465 |
| 5,035,011 A * | 7/1991 | Rozenblatt et al. ............ 4/665 |
| 5,106,493 A * | 4/1992 | McIntosh .................... 210/100 |
| 5,147,532 A * | 9/1992 | Leek, Jr. ...................... 210/97 |
| 5,245,711 A | 9/1993 | Oldfelt et al. |
| 5,421,040 A * | 6/1995 | Oldfelt ........................ 4/435 |
| 5,454,936 A * | 10/1995 | Ask et al. .................... 210/86 |
| 5,611,088 A * | 3/1997 | Almon ......................... 4/222 |
| 6,143,185 A * | 11/2000 | Tracy et al. ................. 210/744 |
| 6,319,390 B1 | 11/2001 | Kono et al. |
| 6,463,956 B1 | 10/2002 | Walker |
| 2004/0031761 A1 | 2/2004 | Wunsche et al. |
| 2004/0133968 A1 | 7/2004 | Hoehne et al. |
| 2005/0126927 A1 | 6/2005 | Lindauer et al. |

FOREIGN PATENT DOCUMENTS

| | | |
|---|---|---|
| DE | 3500130 | 7/1986 |
| DE | G8717458 | 4/1989 |
| DE | 3809888 | 10/1989 |

(Continued)

*Primary Examiner*—Matthew O. Savage
(74) *Attorney, Agent, or Firm*—W. F. Fasse; W. G. Fasse

(57) ABSTRACT

In order to use so-called gray water for the flushing of toilets, for example in a conveyance such as a passenger aircraft, the gray water is passed through at least one filter, preferably through a coarse filter followed by a fine filter, into a treatment tank where it is anodically oxidized. The rinsing is performed by a pump that may be a rotary pressure pump or a piston cylinder pump. The pump passes the processed or oxidized water through an excess pressure valve and through at least one spray nozzle into a toilet bowl.

23 Claims, 2 Drawing Sheets

FOREIGN PATENT DOCUMENTS

| | | |
|---|---|---|
| DE | 3901320 | 6/1990 |
| DE | 4328014 | 1/1994 |
| DE | G9410633 | 9/1994 |
| DE | G 94 17 730 | 2/1995 |
| DE | 4429201 | 2/1996 |
| DE | 296 18 711 | 2/1997 |
| DE | 197 17 579 | 10/1998 |
| EP | 0 653 520 | 5/1995 |
| JP | 06273171 | 9/1994 |

* cited by examiner

METHOD AND APPARATUS FOR PROCESSING AND RE-USING OF GRAY WATER FOR FLUSHING TOILETS

PRIORITY CLAIM

This application is based on and claims the priority under 35 U.S.C. §119 of German Patent Application 102 29 799.1, filed on Jul. 3, 2002, the entire disclosure of which is incorporated herein by reference.

FIELD OF THE INVENTION

The invention relates to a method and apparatus for processing and re-using of gray water for the flushing of toilets, particularly in vacuum toilet systems used in aircraft to optimize the use of available water.

BACKGROUND INFORMATION

Commercial aircraft currently carry fresh water for the flushing of vacuum operated toilets in these aircraft. Moreover, the lavatory basins also use freshwater which, by its use in the handwash basin becomes so called "gray water". Thus, in the passenger lavatories substantial quantities or volumes of gray water are produced, which conventionally are not used for any further purpose. The inventors have discovered that following a simple treatment or processing of this gray water it would be quite suitable for use as toilet flushing water.

OBJECTS OF THE INVENTION

In view of the foregoing it is the aim of the invention to achieve the following objects singly or in combination:
- to provide a method and apparatus that will enable the use of gray water produced in an aircraft or other conveyance particularly in lavatory basins and other use locations such as bathtubs and showers on a ship that do not produce black water; and
- to reduce the amount of fresh water that an aircraft conventionally had to carry to avoid the use of disinfectants in the treatment of the gray water.

SUMMARY OF THE INVENTION

According to the invention there is provided a method for processing and reusing gray water for flushing a toilet, comprising the following steps:
 a) filtering said gray water to provide filtered water,
 b) collecting said filtered water in a processing tank,
 c) anodically oxidizing said filtered water in said processing tank to provide processed water, and
 d) using said processed water for flushing a toilet bowl in a lavatory or toilet.

According to the invention there is further provided an apparatus for processing and reusing gray water, said apparatus comprising:
 a) at least one filter having a filter inlet connected to a source of said gray water and a filter outlet,
 b) a processing tank having an inlet connected to said filter outlet,
 c) means for anodically oxidizing filtered water in said processing tank to provide processed, oxidized water, and
 d) a pump connected with a pump inlet to said processing tank, an excess pressure valve connected to an outlet of said pump, at least one rinsing spray nozzle installed in a toilet bowl and connected to said excess pressure valve for rinsing said toilet bowl in response to a generated control signal for a predetermined time interval at the end of which said pump is automatically switched off and said excess pressure valve is closed again. The pump may be any pump that generates a sufficient water pressure to open the excess pressure valve. A rotary or piston cylinder pump is suitable.

DESCRIPTION OF THE DRAWING

The accompanying

DETAILED DESCRIPTION OF A PREFERRED EXAMPLE EMBODIMENT AND OF THE BEST MODE OF THE INVENTION

Figure 1:
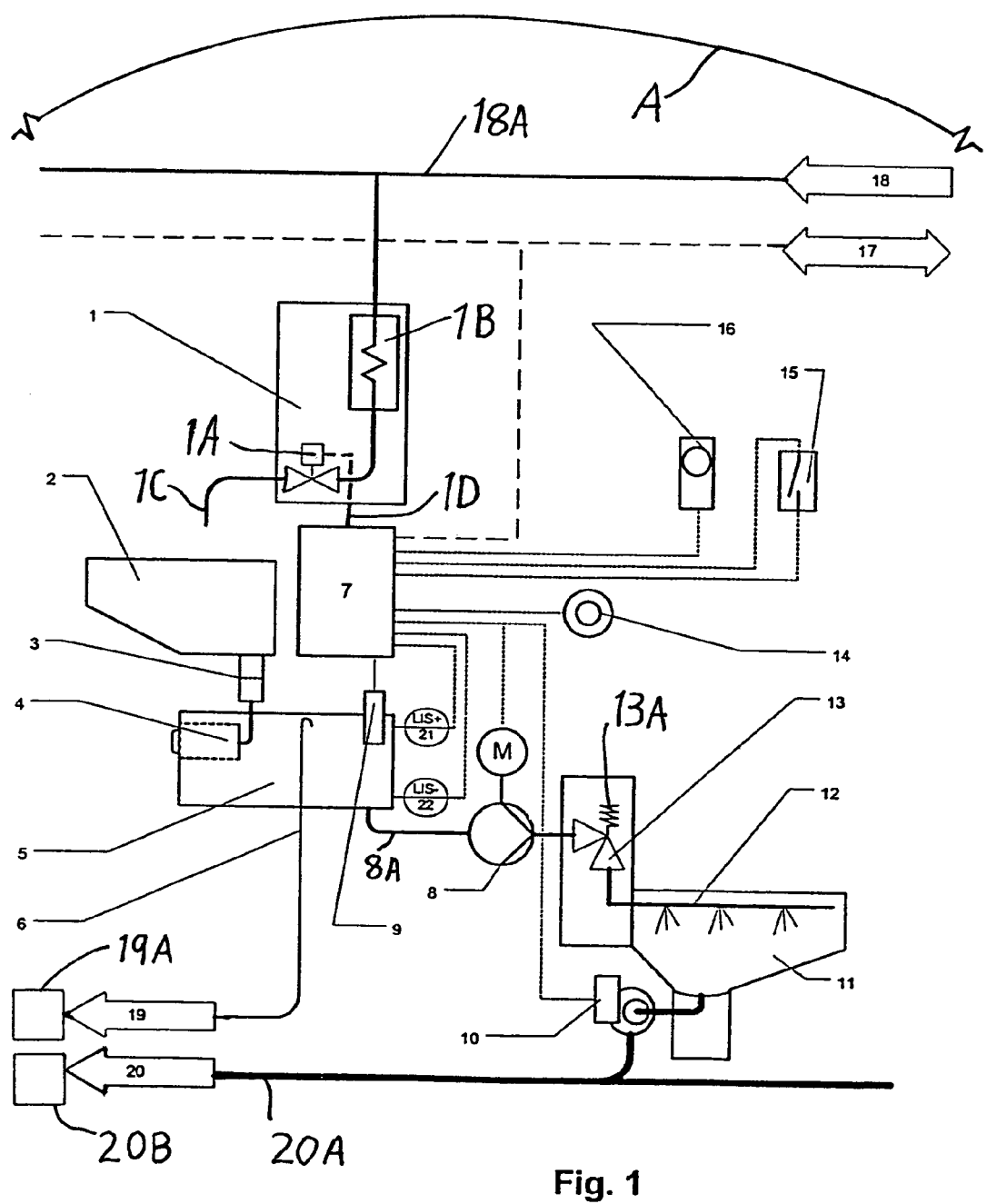
FIG. 1 shows a block diagram of an apparatus for performing the present method.

The block diagram of FIG. 1 shows the important components that are installed, for example in a toilet or lavatory of a commercial passenger aircraft indicated schematically at A. The components include an apparatus for treating and reusing gray water for the flushing of a toilet. A faucet 1 is installed for supplying fresh water into a lavatory basin 2. The faucet receives fresh water from a source 18 through a fresh water conduit 18A. The faucet 1 is controllable either manually or automatically by a faucet control 1A. A heater 1B provides hot water to the faucet. The faucet discharges fresh water through an outlet 1C into the lavatory basin 2. An easily exchangeable coarse filter 3 is installed in the outlet of the basin 2 to feed coarsely filtered gray water through a further fine filter 4 that is also easily cleaned or exchanged. The fine filter is preferably installed in a gray water treatment chamber 5 so that the fine filter 4 is externally accessible for maintenance. Contaminations and any coloring agents are removed from the gray water and remain in the fine filter 4.

The gray water after passing through the coarse filter 3 and the fine filter 4 is collected in the processing tank or treatment chamber 5 for a further treatment by an anodic oxidizer 9 controlled by a central control unit 7.

The treatment chamber 5 in which the gray water is collected, is equipped with an overflow 6 that leads into a gray water collecting conduit 19. The excess gray water taken up by the overflow 6 is either used in a tank cleaning system for cleaning a wastewater collecting tank 20B, including a gray water collecting tank or container 19A located near the wastewater collectinp tank 20B, a pressure increasing pump and at least one spray nozzle (not shown). Alternatively, any excess processed water can be fed to a discharge or drainage mast for discharge outside the aircraft body.

The treatment chamber or processing tank 5 is also equipped with preferably at least two water level sensors LIS21 and LIS22 which provide their sensor signals to the central processing unit 7 which processes the sensor signals to form control signals. If the water content, or rather the treated water content in the treatment chamber or processing tank 5 reaches the low level sensed by the sensor LIS22, the respective signal is processed to provide a control signal for the controller 1A of the faucet 1 to thereby replenish the water in the treatment tank 5 with fresh water from the fresh water source 18. This replenishing takes place automatically through the lavatory basin 2 and is preferably performed when the respective toilet is unoccupied. For this purpose a toilet door switch 15 and an infrared sensor 16 are used to provide their respective signals to the central processing unit 7, which in turn provides a control signal through an electrical connection 1D to the faucet 1. The automatic replenishing is disabled when the toilet is occupied so as not to startle a user when the faucet would open automatically. The replenishing is stopped when the water level in the tank 5 reaches the position of the upper or maximum level sensor LIS21.

It is also possible to preset, in the central processing unit 7, a defined temperature range for the water passing through the faucet 1. The heater 1B is controlled appropriately by the central processing unit 7 so as to maintain the temperature of the water in the defined temperature range.

The flushing of a toilet bowl 11 is initiated by a flushing or rinsing button 14 that also delivers its signal to the central processing unit 7 for starting a motor M that drives a pump 8 for increasing the pressure of the water coming from the tank 5 through a conduit 8A. The pressure is increased until an excess pressure valve 13, operable by the central control unit 7 through a solenoid 13A, opens, to supply flushing water through the nozzles 12 into the toilet bowl 11 for rinsing the toilet bowl. The control unit 7 provides a time interval following the operation of the button 14. At the end of this time interval the motor M is switched off again. Simultaneously, the central control unit 7 energizes a vacuum toilet flushing system or suction device 10 also for a defined time interval, whereby any blackwater containing feces or the like is sucked into the vacuum wastewater system 20 which is equipped with a separate wastewater conduit 20A. According to the invention the fresh water supply conduit 18A, the gray water collecting conduit 19 and the wastewater conduit 20A are entirely separate from each other. In other words, there is no direct connection between these conduits 18A, 19 and 20A.

The control, closed loop control, and monitoring of the above described replenishing operation, pumping operation, and flushing operation and the power supply to the pump, valves and vacuum flushing system 10 is performed by the central control unit 7 which in turn communicates with other system components in the aircraft through a so-called CAN-BUS 17, also referred to as a communication area network.

As described herein, water is replenished into the processing tank 5 from the faucet 1 through the lavatory basin 2. This can be carried out in different ways, for example as follows. The water replenishment may involve detecting at least one filling level in the processing tank 5 as a minimum filling level with the sensor LIS22, producing a control signal as a minimum level control signal from the sensor LIS22 for controlling the fresh water supply faucet 1 of the lavatory basin 2 for replenishing water in the processing tank 5 to a medium filling level from the fresh water supply faucet 1. Alternatively the water replenishment may involve sensing a plurality of filling levels including a high filling level with the sensor LIS21 and a low filling level with the sensor LIS22 in the processing tank 5 to produce respective high filling level and low filling level control signals for controlling the fresh water supply through the faucet 1 and the lavatory basin 2 so that a larger fresh water volume is supplied into the processing tank 5 through the faucet 1 and lavatory basin 2 in response to the low filling level signal and a smaller fresh water volume is supplied into the processing tank 5 through the faucet 1 and lavatory basin 2 in response to the high filling level control signal. Also, the water discharge or withdrawal from the processing tank 5 may involve sensing a plurality of filling levels including a maximum filling level with the sensor LIS21 and a minimum filling level with the sensor LIS22 in the processing tank 5 to produce respective higher and lower filling level control signals for controlling the withdrawal of processed water from the processing tank 5 so that more processed water is withdrawn from the processing tank 5 in response to the higher filling level control signal and less processed water is withdrawn from the processing tank 5 in response to the lower filling level control signal.

Figure 2:
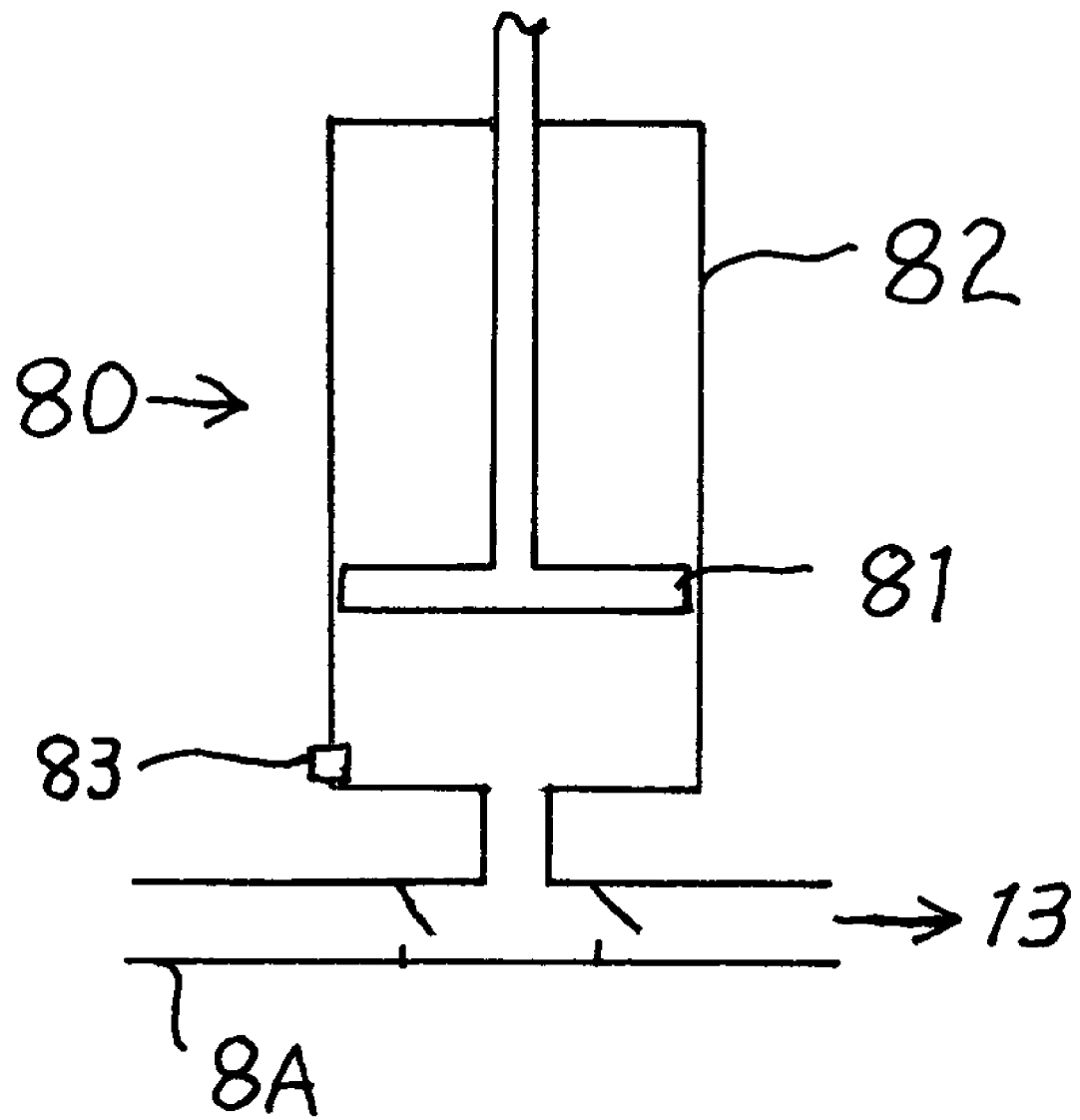
FIG. 2 shows an alternative embodiment of a pump of such an apparatus.

Instead of using a rotary pump, the pump 8 could be a piston cylinder pump 80 shown schematically in FIG. 2. In such a pump 80 a sensor 83 monitors and detects the end position of the piston 81 in the cylinder 82 to provide a control signal indicating to the control unit 7 that the processed water in the cylinder 82 has been discharged. Thereupon the control unit 7 controls the driving of the piston 81 back into a starting position thereby sucking a next dosed volume of treated water into the cylinder 82 for the next toilet flushing.

Advantages of the invention are seen in that the use of fresh water is noticeably reduced, whereby it is now possible to use smaller freshwater tanks in an aircraft, thereby reducing the required fresh water volume with the added benefit of reducing the starting weight of the aircraft, which in turn positively influences the payload or the fuel consumption.

Yet another advantage is seen in that the anodic oxidizing of the gray water as taught by the invention obviates the use of a so-called recharge liquid which is a disinfectant that is mixed into the gray water or wastewater so that the wastewater tank does not require a separate disinfection. Again, obviating the need for a disinfection agent reduces the starting weight of the aircraft with the same positive effects regarding the payload and the fuel consumption as mentioned above.

Another advantage is seen that by not using the so-called disinfecting agent no water is produced that requires a special handling of the respective wastewater on the ground when servicing an aircraft which is conventionally rather expensive. By using the anodically oxidized gray water as taught by the invention as a toilet rinsing water, the resulting wastewater can be discharged directly into sewage treatment plants on the ground. Furthermore, the anodically oxidized rinsing water acts as a preventive agent against the formation of a so-called biofilm in toilets and respective wastewater conduits.

A further advantage is seen in that the present system can work with noticeably higher rinsing pressures than are conventionally possible. This has a positive influence since less water can be used for the toilet flushing, while even better cleaning results are achieved.

The control of all toilet facilities and their respective components takes place by a single control unit 7. The connection to other aircraft systems is possible through the above mentioned simple so-called CANBUS 17, which is available in the aircraft anyway and thus no further efforts and expenses are necessary for an individual wiring system.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A method for processing and reusing gray water for flushing a toilet bowl, comprising the steps:

a) filtering said gray water to provide filtered water,
b) collecting said filtered water in a processing tank,
c) processing said filtered water by anodically oxidizing said filtered water in said processing tank to provide processed water, and
d) using said processed water for flushing said toilet bowl,
wherein said filtering comprises a coarse filtering and a fine filtering for removing dirt, coloring agents, and odor-causing agents from said gray water, and wherein said fine filtering is performed in said processing tank and said coarse filtering is performed outside said processing tank.

2. The method of claim 1, further comprising using an exchangeable, externally accessible fine filter in said processing tank for performing said fine filtering.

3. The method of claim 1, further comprising using an exchangeable, externally accessible coarse filter connected to a lavatory basin for performing said coarse filtering.

4. The method of claim 1, wherein said step of anodically oxidizing is performed to such an extent that germ growth is prevented in or on any component of a water distribution system through which said processed water is distributed.

5. The method of claim 1, further comprising detecting through a sensor at least one filling level in said processing tank to produce a control signal for controlling a water flow.

6. The method of claim 5, further comprising detecting said at least one filling level as a minimum filling level, producing said control signal as a minimum level control signal for controlling a fresh water supply faucet of a lavatory basin in a lavatory for replenishing water in said processing tank to a medium filling level from said fresh water supply faucet.

7. The method of claim 6, further comprising sensing an unoccupied status of said lavatory to provide an unoccupied control signal, and automatically opening said fresh water supply faucet only in response to said minimum level control signal and said unoccupied control signal.

8. The method of claim 6, further comprising using an infrared detector and a lavatory door switch for performing said sensing, and further producing an occupied control signal to disable said automatic opening of said fresh water supply faucet when said lavatory is occupied.

9. The method of claim 1, further comprising providing an overflow discharge in said processing tank and feeding said overflow discharge into a gray water collecting conduit.

10. The method of claim 9, further comprising leading said gray water collecting conduit into a gray water collecting container.

11. The method of claim 10, further comprising locating said gray water collecting container near a wastewater collecting tank.

12. The method of claim 1, further comprising monitoring and controlling all of said steps through a central processing unit and respective sensors.

13. The method of claim 1, further comprising presetting in a central processing unit a defined temperature range for water passing through a faucet of a lavatory basin having an outlet connected to said processing tank, and using said central processing unit to control a water heater connected upstream of said faucet so as to heat said water as needed to maintain a temperature of said water in said defined temperature range.

14. The method of claim 1, further comprising sensing a plurality of filling levels including a maximum filling level and a minimum filling level in said processing tank to produce respective higher and lower filling level control signals for controlling the withdrawal of processed water from said processing tank so that more processed water is withdrawn from said processing tank in response to said higher filling level control signal and less processed water is withdrawn from said processing tank in response to said lower filling level control signal.

15. The method of claim 1, further comprising sensing a plurality of filling levels including a high filling level and a low filling level in said processing tank to produce respective high filling level and low filling level control signals for controlling a fresh water supply through a faucet and a lavatory basin so that a larger fresh water volume is supplied into said processing tank through said faucet and lavatory basin in response to said low filling level signal and a smaller fresh water volume is supplied into said processing tank through said faucet and lavatory basin in response to said high filling level control signal.

16. The method of claim 15, further comprising starting replenishing water in said processing tank in response to said low filling level control signal and stopping said replenishing in response to said high filling level control signal when water in said processing tank reaches said high filling level.

17. An apparatus for processing and reusing gray water for flushing a toilet bowl, comprising:
    a) filter means for filtering said gray water to provide filtered water,
    b) a processing tank for collecting said filtered water in said processing tank,
    c) anodic oxidizer means for processing said filtered water by anodically oxidizing said filtered water in said processing tank to provide processed water, and
    d) means for using said processed water for flushing said toilet bowl,
    wherein said filter means comprise a coarse filter and a fine filter for removing dirt, coloring agents, and odor-causing agents from said gray water, and wherein said fine filter is arranged in said processing tank and said coarse filter is arranged outside said processing tank.

18. The apparatus of claim 17,
    wherein said coarse filter has a coarse filter inlet connected to a source of said gray water and a coarse filter outlet connected to a tank inlet of said processing tank; and
    wherein said means for using said processed water comprises a pump having a pump inlet connected to said processing tank, an excess pressure valve connected to a pump outlet of said pump, a rinsing spray nozzle installed in said toilet bowl and connected to said excess pressure valve for rinsing said toilet bowl with said processed water in response to a generated control signal for a predetermined time interval at the end of which said pump is switched off and said excess pressure valve is closed.

19. The apparatus of claim 18, wherein said pump comprises a cylinder and a piston in said cylinder, said apparatus further comprising a detector positioned for detecting an end position of said piston indicating that processed water in said cylinder has been discharged, said detecting providing a control signal, and a motor responsive to said control signal for driving said piston back into a starting position, whereby processed water is sucked into said cylinder for a next toilet bowl rinse.

20. The apparatus of claim 18, further comprising a central control unit, sensors for providing status signals to said central control unit, a faucet for supplying fresh water to a lavatory basin, and a suction device connected to said toilet bowl, and wherein said central control unit is connected and adapted to control said pump, said faucet and said suction device in response to said status signals.

21. The apparatus of claim 20, further comprising a communication area network (CANBUS) to which said central control unit is connected for communicating via said communication area network.

22. The apparatus of claim 18, further comprising separate conduits for freshwater, gray water and waste water, and wherein a direct connection between said conduits is avoided.

23. The apparatus of claim 18, installed in an aircraft.

\* \* \* \* \*

UNITED STATES PATENT AND TRADEMARK OFFICE
CERTIFICATE OF CORRECTION

| | |
|---|---|
| PATENT NO. | : 7,118,677 B2 |
| APPLICATION NO. | : 10/613530 |
| DATED | : October 10, 2006 |
| INVENTOR(S) | : Hoffjann et al. |

It is certified that error appears in the above-identified patent and that said Letters Patent is hereby corrected as shown below:

<u>Title page</u>,
Item [30], Foreign Application Priority Data,
Line 1, after "(DE)............" replace "102 99 799" by --102 29 799.1--.

Signed and Sealed this

Twenty-seventh Day of March, 2007

JON W. DUDAS
*Director of the United States Patent and Trademark Office*